United States Patent [19]
Ross

[15] 3,727,308
[45] Apr. 17, 1973

[54] APPARATUS FOR PROCESSING CHEESE

[75] Inventor: Joseph H. Ross, Hayward, Calif.

[73] Assignee: Lucky Stores, Inc., San Leandro, Calif.

[22] Filed: Feb. 26, 1970

[21] Appl. No.: 14,556

[52] U.S. Cl. ........................................31/89, 31/46
[51] Int. Cl. ..............................................A01j 25/00
[58] Field of Search ..............31/8, 10, 14, 7, 46, 89; 18/12 SF, 55

[56] References Cited

UNITED STATES PATENTS 3,562,910  2/1971  Runge et al....................31/46
2,572,833  10/1951  Balzarini....................31/14 X
3,111,714  11/1963  Branscum......................18/14
2,481,690  9/1949  Schaub..........................31/8
2,613,618  10/1952  Sharp et al................31/14 X Primary Examiner—Hugh R. Chamblee
Attorney—Gregg & Hendricson

[57] ABSTRACT

The invention relates to apparatus for processing cuttings and trimmings of cheese to reconsolidate it.

5 Claims, 4 Drawing Figures

PATENTED APR 17 1973

INVENTOR.
JOSEPH H. ROSS
BY Gregg & Hendricson
ATTORNEYS

INVENTOR.
JOSEPH H. ROSS

APPARATUS FOR PROCESSING CHEESE

This invention relates to apparatus for processing cheese, more particularly for processing scraps of cheese resulting from cutting bulk cheese to produce smaller, uniform blocks of cheese.

In the production of cheese for retail distribution it is customary to provide the cheese in bulk form, for example, in 40 to 55 pound blocks and to cut these large blocks into smaller blocks, e.g., 1 pound blocks, which are more suitable for sale at retail in grocery markets and the like. In so doing a considerable quantity of cheese is produced in the form of thin slices and small bits and pieces due to the fact that the bulk cheese cannot be cut uniformly into smaller blocks without leaving such slices, bits and pieces of cheese. These thin slices, bits and pieces of cheese left over from the cutting of the bulk cheese into smaller units will be referred to hereinafter as cheese trimmings.

Cheese trimmings heretofore have represented a substantial waste. The trimmings cannot, as a practical matter, be sold at retail in grocery markets. Heretofore cheese trimmings have been sold in bulk to processors such as pizza makers, at a greatly reduced price. Ideally cheese trimmings should be reconstituted into solid blocks similar in cross section to the original bulk cheese in consistency, but equipment and procedures available heretofore for this purpose have been expensive and time consuming. For example, cheese trimmings have been placed in a mold and rammed to form a solid block of cheese but such procedure has been time consuming and expensive and has not produced a product having a uniform, solid, void-free consistency.

It is an object of the present invention to provide improvements in the processing of cheese trimmings and the like.

It is a further object of the invention to provide apparatus which will receive cheese trimmings at an input point and will rapidly and continuously consolidate these trimmings into a solid body of cheese identical or substantially identical in cross section to the original bulk cheese from which the trimmings come and which can then be packaged and marketed in the same manner as small units of cheese cut from bulk cheese.

It is a further object of the invention to provide a process for quickly and economically reconstituting cheese trimmings into a solid cheese consistency which, when cut with a knife, has an appearance identical or substantially identical with that of the original bulk cheese from which the cheese trimmings come.

These and other objects of the invention will be apparent from the ensuing description and the appended claims.

One form of the invention is illustrated by way of example in the accompanying drawings in which:

FIG. 2 omits most of the grinder to the rear of the mold element.

Figure 1:
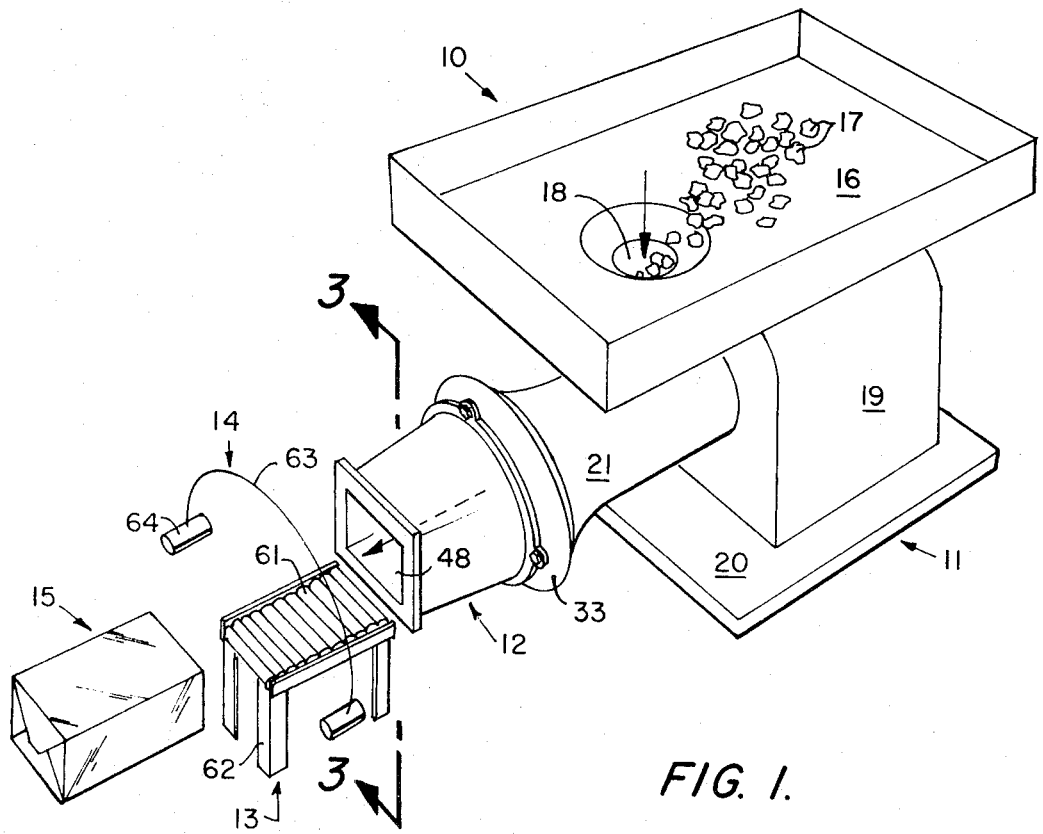
FIG. 1 is a perspective view of a complete apparatus including a grinder, the mold element of the present invention, a conveyor and a cutting instrument, such view also showing the finished, packaged product of the apparatus of this invention.
Figure 3:
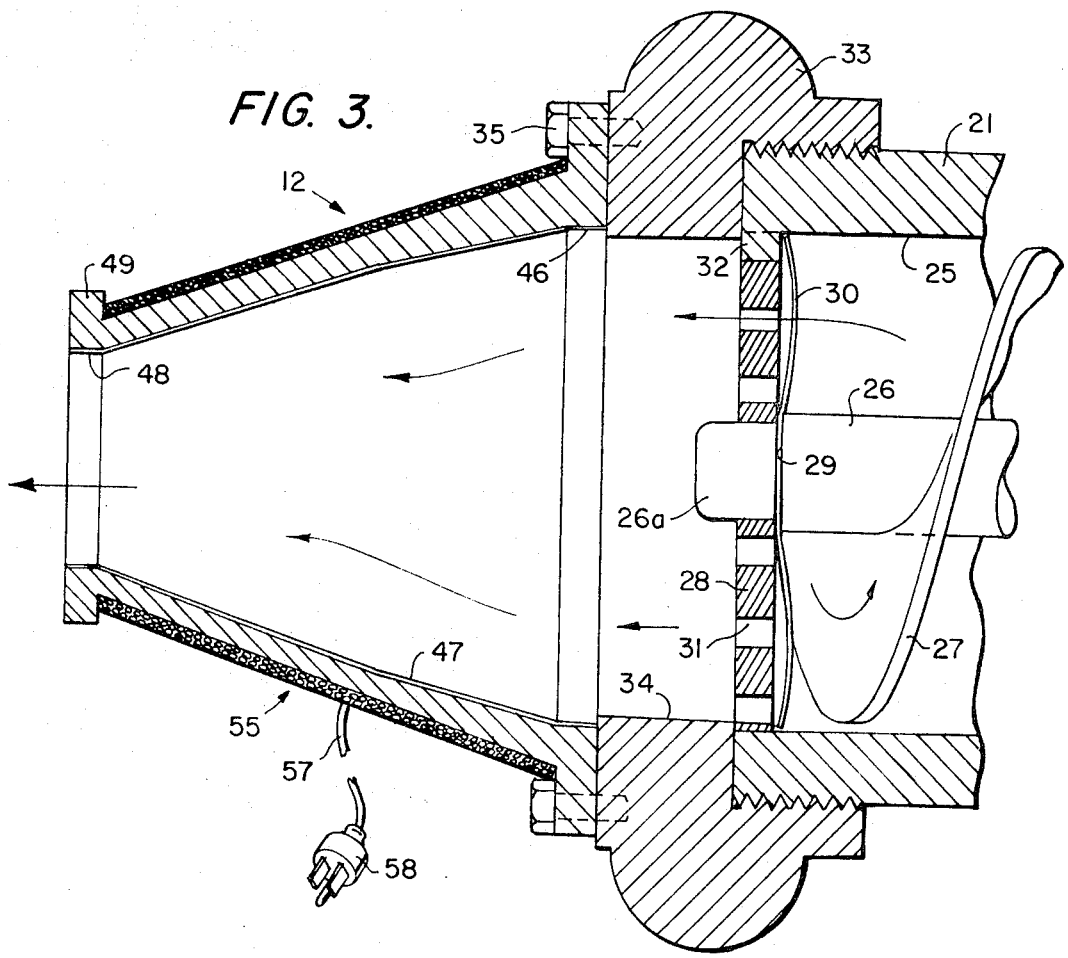
FIG. 3 is a vertical midsectional view taken along the line 3—3 of FIG. 1 but on a larger scale and showing details of internal construction of the grinder and the mold element.
Figure 4:
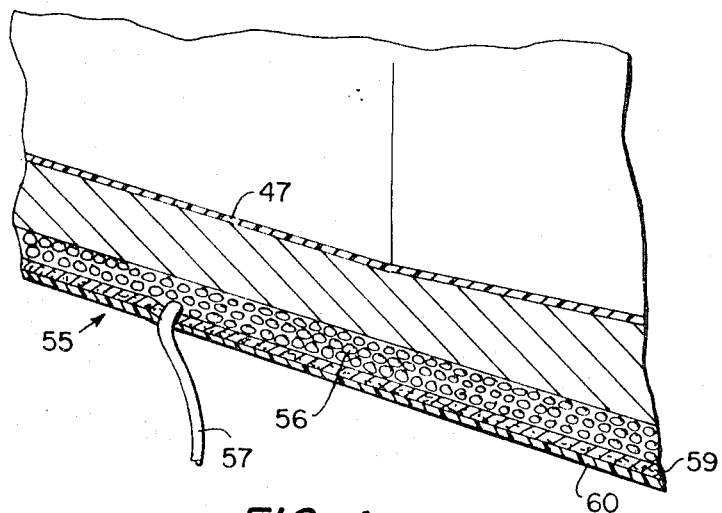
FIG. 4 is a fragmentary view taken similarly to that of FIG. 3 but on a still larger scale showing in detail the internal lining, the outer wrapping and the heating element employed with the mold element of the invention.

Referring now to the drawings and more particularly to FIG. 1 the apparatus is generally designated as 10 and it comprises a conventional helical grinder 11, a mold element 12, a conveyor element 13 and a cutter 14 and it also shows the end product in packaged condition at 15. Grinder 11, as stated, may be a conventional grinder having a hopper 16 into which cheese trimmings 17 are placed, there being an opening 18 in the hopper to permit entry of the cheese trimmings into the grinder. The grinder has a body 19 which may include an electric motor, a base 20 and a tubular part 21. Referring now to FIG. 3 the tubular part 21 provides an axial passage 25 in which a shaft 26 is coaxially mounted, such shaft having affixed to it a helical feed member or auger 27 of standard design. At its rear end (not shown) the shaft 26 and auger 27 are suitably mounted by bearing means (not shown) for support and rotation. At its outer end the shaft is reduced in diameter to form a hub 26a over which a perforated plate 28 is fitted and butted against the annular face 29 of the shaft at the base of the hub. A multiple (e.g., four) bladed knife 30 is locked between the plate 28 and annular face 29. The plate 28 has holes 31 therein which typically have a diameter of ⅛ to 3/16 inch. The plate 28 is locked against rotation by projections on the tube 21 (one of which is shown at 32) which are seated in corresponding notches in the plate 28. An outer hub 33 is screwed onto the end of tube 21 and it has an axial opening 34 which is smaller in diameter than the tubular passage 25 and plate, such that it holds the plate against the shaft 26 against longitudinal displacement. The plate 28 is of stainless steel and the shaft 26 of cast iron construction whereby the shaft 26 rotates freely on the plate; hence a special bearing is not required.

As thus far described grinder 11 is conventional. Other, preferably helical or auger type grinders may be used although any other type of feed equipment may be employed which is capable of forcing cheese trimmings through holes in plate 28 and thereby extruding the cheese in rod-like form. The multi-bladed knife 30 is useful in that it slices the cheese and force it through holes 31 in rod-like form. The cheese trimmings are consolidated to some extent by reason of their passage through the grinder 21 under the action of the auger 27 and knife 30 and extrusion through holes 29.

The mold element 12 is bolted onto the front face of hub 33 by bolts 35. The mold element is preferably of fairly heavy metal construction, e.g., steel or cast iron although other metals and non-metallic materials may be used. A suitable wall thickness is about ¼ to ⅜ inch. As will be seen the internal cavity of the mold element 12 tapers from its inlet end adjacent the grinder to its outlet end. At its inlet end at 46, this cavity is preferably circular and approximately the same internal diameter as the tubular member 21 of the grinder and of the adapter hub 33. Forwardly, or to the left as viewed in FIG. 3, this cavity tapers rather steeply and its outer end, at 48, is rectangular in shape (see FIGS. 1 and 2). The shape and dimensions of the outlet opening 48 are such as to produce an end product having the shape and dimensions desired in cross section. For example if it is desired to produce cheese in cylindrical form the opening 48 will be round but if it is intended that the cheese be rectangular in cross section the outlet opening 48 will be rectangular as shown. The internal wall of the mold element is preferably lined with a heat resistant plastic material 47 having suitable lubricating qualities. A suitable lining material is Teflon which is a trademark of E. I. du Pont de Nemours Co. for polytetrafluoroethylene. Teflon is desirable not only because of its heat resistance but because of its inherent lubricity and low coefficient of friction. The outlet end 48 of the mold element 12 is shown with a flange 49 upon which the element may rest when it is detached from the grinder and is in storage.

Externally the mold element 12 is provided with a cover 55 which includes a resistance winding 56 having a cord 57 and a plug 58 whereby electric current can be passed through the winding for heating in the manner and for the purpose described below. An asbestos wrapper 59 is provided externally of the resistance winding and an outermost layer or cover 60 of fiberglass is also provided. The resistance winding 56 may be a conventional heating element; the asbestos layer 59 functions to conserve heat and to prevent the surface from becoming hot to the touch and the function of the fiberglass outer cover is to provide resistance to abrasion and other destructive forces.

In use cheese trimmings as shown at 17 are supplied to the hopper 16 as fast as they are processed by the grinder 11. The production speed is determined by the speed at which the grinder is operated and by its capacity. The cheese trimmings enter the grinder through opening 18 and are forced along the tube 21 by the helical feed 27 and are compacted somewhat in the process. The cheese is then extruded through the holes 31 in the plate 28 into the mold element 12. The taper given to the mold element 12 causes the body of cheese entering the element to be compacted more and more as it proceeds from right to left as viewed in FIG. 3. As a result the cheese is completely compacted so that when it is cut the surface of the cheese revealed by the cut is solid, is lacking or substantially lacking in the holes or voids and is in all substantial respects identical with the original bulk cheese.

An important feature of the invention is the self lubricating, low coefficient of friction lining 47 which reduces friction, drag and jamming. Another important feature is the provision of heat which acts to bring out a small amount of oil from the cheese and/or to liquefy or semi-liquefy the surface of the cheese so that a self lubricating function is achieved. This avoids the necessity of lubrication by adding a lubricant which is impractical because of the need to replenish it. By the construction and mode of operation described, a process of self lubrication is provided which is quite adequate for the purpose and which avoids the need for and the disadvantages of an added lubricant.

Figure 2:
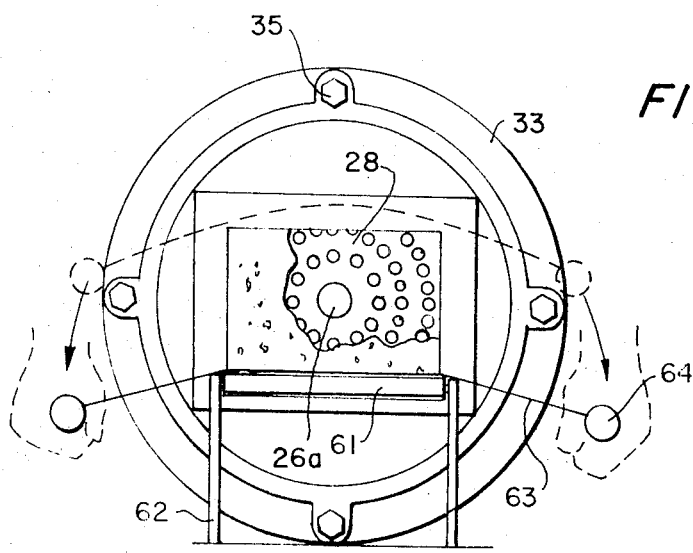
FIG. 2 is a view in front elevation of the machine of FIG. 1 as seen at the outlet (mold element) end, such view being partly broken away to show the perforated plate through which cheese trimmings are extruded.

As stated above, the compacted, reconsolidated cheese is extruded from the outlet opening 48 of the mold element 12 in rectangular form (if that is the shape desired), the shape and dimensions being as desired. This cheese is delivered to a suitable conveyor or support such as the conveyor 13 having rollers 61 supported on a frame and legs 62. A simple cutter 14 is provided which includes a thin wire 63 attached at its opposite ends to handles 64 by which as shown in FIG. 2, the cheese can be sliced. This can be done in a continuous operation to produce a product which is shown in packaged form at 15.

It will therefore be apparent that a novel and advantageous apparatus and a novel and advantageous method of reconsolidating and reconstituting bulk cheese from cheese trimmings is provided. The apparatus and method are applicable to cheese, cheese products such as mixtures of cheese and sausage, and other food products generally which are similar in consistency to cheese. The cheese may be soft or hard as long as it is a cheese which can be provided in solid bulk form and cut into shaped blocks.

I claim:

1. A cheese molding apparatus capable of consolidating and molding trimmings of solid cheese into a consolidated block, said apparatus comprising:
   a. a feed device having an inlet and an outlet and a driven helical feed auger for advancing cheese trimmings from the inlet to the outlet and forcing the cheese through the outlet;
   b. a molding device having an inlet end communicating with the outlet of the feed device, having an outlet end remote from the outlet of the feed device and having a passage between said inlet and outlet ends, such passage being enclosed by a wall and being inwardly tapered in cross section from the inlet to the outlet end so as to compress cheese passing therethrough and to mold it into the form of a block in cross section;
   c. perforated plate means between the feed device outlet and the molding device inlet; and
   d. heating means for heating of the wall of such passage.

2. The apparatus of claim 1 wherein the wall of said passage is lined with a self-lubricating lining.

3. The apparatus of claim 2 wherein said lining is Teflon.

4. The apparatus of claim 1 wherein the heating means is an electrical heating means.

5. A method of reconstituting cheese trimmings resulting from the cutting of large blocks of solid cheese into smaller blocks, said method being operable to compress and mold such trimmings into blocks of cheese having a uniform cross section and substantially duplicating the texture and integrity of the original large blocks of cheese, said method comprising:
   a. providing communicating feeding and molding devices each with its own inlet and outlet and with the feed device outlet communicating with the molding device inlet through perforated plate means, said feeding device having a driven helical feed auger and said molding device having an outlet of smaller area than the inlet together with a communicating passage therebetween which tapers inwardly in cross section from the mold inlet to the outlet thereof, and
   b. continuously forming the cheese trimmings into a consolidated shape corresponding in cross section to that of the molding device outlet by initially consolidating the trimmings with the driven auger as they are advanced thereby to the perforated plate means, further consolidating the cheese material under the forcing action of the auger by extruding the cheese through the perforated plate means, and finally completing the consolidation process within the molding device by continuing said forcing action so as to pass the cheese from the plate means through said passage while applying heat to the wall thereof to supply lubrication as provided by the heated cheese, thereby causing the desired cheese product to be continuously extruded out the mold outlet in block form ready for cutting.

* * * * *